US010042219B2

(12) United States Patent
Wu et al.

(10) Patent No.: US 10,042,219 B2
(45) Date of Patent: Aug. 7, 2018

(54) PIXEL STRUCTURE, DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Huishun Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/326,345

(22) PCT Filed: Feb. 1, 2016

(86) PCT No.: PCT/CN2016/073053
§ 371 (c)(1),
(2) Date: Jan. 13, 2017

(87) PCT Pub. No.: WO2017/049827
PCT Pub. Date: Mar. 30, 2017

(65) Prior Publication Data

US 2017/0269438 A1 Sep. 21, 2017

(30) Foreign Application Priority Data

Sep. 23, 2015 (CN) .......................... 2015 1 0614178

(51) Int. Cl.
*G02F 1/1343* (2006.01)
*G02F 1/1368* (2006.01)
(Continued)

(52) U.S. Cl.
CPC ...... *G02F 1/134309* (2013.01); *G02F 1/1368* (2013.01); *G02F 1/13439* (2013.01);
(Continued)

(58) Field of Classification Search
CPC ............... G02F 1/134363; G02F 2001/134372
See application file for complete search history.

(56) References Cited

U.S. PATENT DOCUMENTS 7,623,191 B2 11/2009 Liao et al.
2008/0068549 A1 3/2008 Liao et al.
(Continued)

FOREIGN PATENT DOCUMENTS

CN 104317122 A 1/2015
CN 104483788 A 4/2015
(Continued)

OTHER PUBLICATIONS

International Search Report and Written Opinion (including English translation of Box V.) dated Jun. 20, 2016, for corresponding PCT Application No. PCT/CN2016/073053.
First Chinese Office Action, for Chinese Patent Application No. 201510614178.X, dated Aug. 24, 2017, 9 pages.

*Primary Examiner* — Wen-Ying P Chen
(74) *Attorney, Agent, or Firm* — Kinney & Lange, P.A.

(57) ABSTRACT

A pixel structure includes a plurality of pixel units arranged in an array. Each of the pixel units includes a first electrode, a second electrode and a thin film transistor, the first electrode having a plate-like structure, and the second electrode having a plurality of strip-shaped electrodes and connecting electrodes to connect the strip-shaped electrodes together. A slit is formed between each two adjacent strip-shaped electrodes, and an end of each slit facing towards the thin film transistor is angled. In any two adjacent pixel units in each column of pixel units, a structure of the second electrode in one pixel unit is in a mirror symmetrical relation
(Continued)

with that in the other pixel unit relative to a row direction, and an aperture ratio of a pixel unit in which the slit of the second electrode is angled towards the thin film transistor is larger than an aperture ratio of the other pixel unit.

13 Claims, 5 Drawing Sheets

(51) Int. Cl.
*G02F 1/1362* (2006.01)
*G02F 1/1335* (2006.01)

(52) U.S. Cl.
CPC .. *G02F 1/133512* (2013.01); *G02F 1/136209* (2013.01); *G02F 1/134363* (2013.01); *G02F 2001/134372* (2013.01); *G02F 2201/121* (2013.01); *G02F 2201/123* (2013.01); *G02F 2201/40* (2013.01)

(56) References Cited

U.S. PATENT DOCUMENTS

2012/0127148 A1* 5/2012 Lee .................. G02F 1/134363 345/212
2012/0320320 A1* 12/2012 Chen ................ G02F 1/133707 349/106
2015/0098041 A1 4/2015 Jung et al.
2016/0104447 A1 4/2016 Lin et al.
2016/0155756 A1 6/2016 Lin et al.
2016/0187746 A1 6/2016 Yue et al.

FOREIGN PATENT DOCUMENTS

CN 104536215 A 4/2015
CN 104834142 A 8/2015
CN 105093726 A 11/2015

* cited by examiner

PIXEL STRUCTURE, DISPLAY PANEL AND DISPLAY DEVICE

CROSS-REFERENCE TO RELATED APPLICATION

This application is a Section 371 National Stage Application of International Application No. PCT/CN2016/073053, filed on Feb. 1, 2016, entitled "PIXEL STRUCTURE, DISPLAY PANEL AND DISPLAY DEVICE", which has not yet published, which claims priority to Chinese Application No. 201510614178.X, filed on Sep. 23, 2015, incorporated herein by reference in their entirety.

BACKGROUND OF THE DISCLOSURE

Field of the Disclosure

The present disclosure relates to a field of display technology, in particular, to a pixel structure, a display panel and a display device.

Description of the Related Art

With the development of science and technology, liquid crystal displays are more and more widely used in modern life, for example, mobile phone display, computer display, TV display and so on. A conventional single-domain liquid crystal display has been unable to meet requirements of people for the liquid crystal display due to disadvantages such as low contrast, asymmetrical viewing angle and color cast appearing when viewing a displayed image from different viewing angles.

The conventional liquid crystal display may alleviate the color cast associated with side viewing angles by means of double-domain liquid crystal display technology. In a conventional pixel structure for realizing double-domain liquid crystal display, any two adjacent pixel units in a column direction of the pixel units have the same aperture ratio. In electrodes provided with slits, ends of the slits facing towards thin film transistors are angled towards different orientations. In this way, in any two adjacent pixel units in the column direction, pure liquid crystal luminous efficiency at the angled ends of the slits of the electrodes presents a big difference. As a result, overall liquid crystal luminous efficiency and light transmittance present a big difference between two pixel units, so that a stripe is arising between the two pixel units.

SUMMARY

In order to solve at least one aspect of the above defects, the present disclosure provides the following solutions.

According to an aspect of the present disclosure, it is provided a pixel structure. The pixel structure comprises a plurality of pixel units arranged in an array. Each of the pixel units comprises a first electrode, a second electrode and a thin film transistor, the first electrode having a plate-like structure, and the second electrode having a plurality of strip-shaped electrodes and connecting electrodes to connect the plurality of strip-shaped electrodes together. A slit is formed between each two adjacent strip-shaped electrodes, and an end of each slit facing towards the thin film transistor is angled. In any two adjacent pixel units in each column of pixel units, a structure of the second electrode in one pixel unit is in a mirror symmetrical relation with a structure of the second electrode in the other pixel unit relative to a row direction, and an aperture ratio of the pixel unit in which the slit of the second electrode is angled towards the thin film transistor is larger than an aperture ratio of the other pixel unit.

According to some embodiments, in each of the pixel units, the first electrode is a common electrode and the second electrode is a pixel electrode.

According to some embodiments, in each of the pixel units, the first electrode is a pixel electrode and the second electrode is a common electrode.

According to some embodiments, in each row of pixel units, the second electrodes have the same structure and the first electrodes have the same structure.

According to another aspect of the present disclosure, it is provided a display panel. The display panel comprises the pixel structure according to any one of the above aspect or embodiments.

According to some embodiments, the display panel comprises an array substrate and an opposite substrate opposite to the array substrate, and wherein the opposite substrate is provided with a black matrix layer so that an aperture ratio of each of the pixel units in the pixel structure is controllable by means of an opening provided in the black matrix layer, or the array substrate is provided with a black matrix layer so that an aperture ratio of each of the pixel units in the pixel structure is controllable by means of an opening provided in the black matrix layer.

According to another further aspect of the present disclosure, it is provided a display device. The display device comprises the display panel according to any one of the above aspect or embodiments.

DETAILED DESCRIPTION OF PREFERRED EMBODIMENTS OF THE DISCLOSURE

Figure 1:
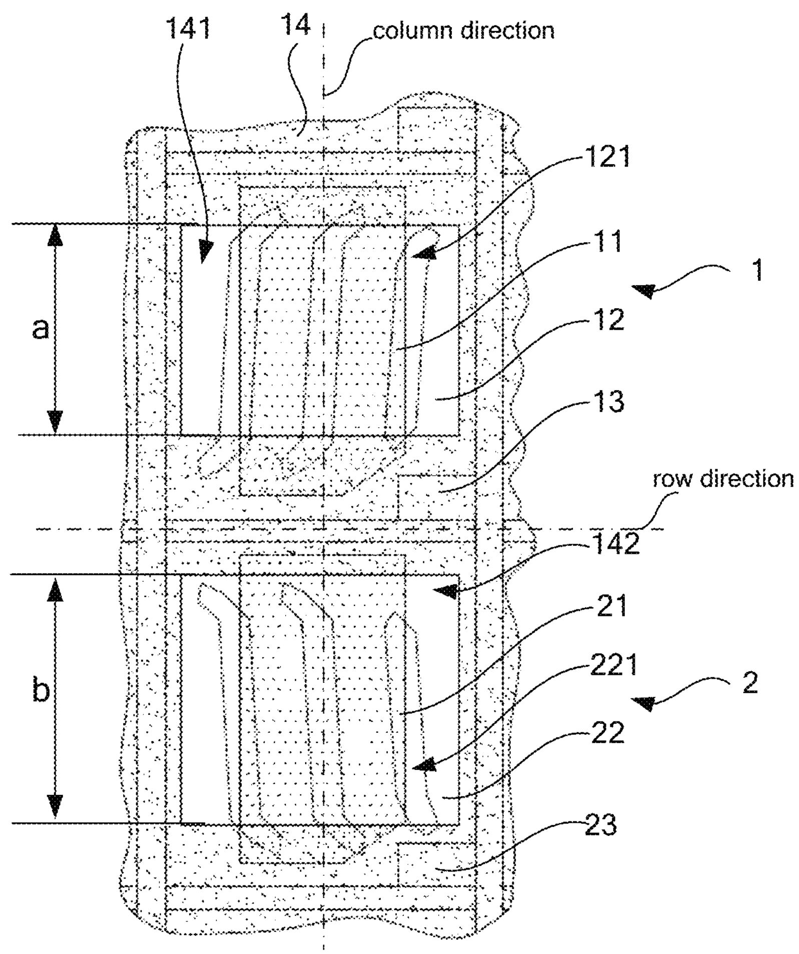
FIG. 1 is a schematic view of a pixel structure according to an embodiment of the present disclosure.

Hereinafter, technical solutions in the embodiments of the present disclosure will be clearly and completely described in conjunction with the drawings of the embodiments of the present disclosure. It is obvious that the embodiments to be described are only a part of embodiments of the present disclosure, rather than all of the embodiments. Based on the embodiments of the present disclosure, all other embodiments obtained by those skilled in the art without any creative efforts belong to the scope of the present invention.

It is to be noted that, the terms "up", "down", "row direction", and "column direction" and the like as used in the specification and the claims of the present disclosure indicate orientations or position relations which are based on the orientations or position relationships as shown in the drawings, merely for purposes of describing the present disclosure and simplifying the description, rather than to indicate or imply that the indicated device or element must have a particular orientation, or be constructed and operated in a particular orientation. Thus, such terms are not to be considered as limiting the present disclosure.

The present disclosure provides a pixel structure, a display panel and a display device. The pixel structure includes a plurality of pixel units arranged in an array. Each of the pixel units includes a first electrode, a second electrode and a thin film transistor, the first electrode having a plate-like structure, and the second electrode having a plurality of strip-shaped electrodes and connecting electrodes to connect the plurality of strip-shaped electrodes together. A slit is formed between each two adjacent strip-shaped electrodes, and an end of each slit facing towards the thin film transistor is angled. In any two adjacent pixel units in each column of pixel units, a structure of the second electrode in one pixel unit is in a mirror symmetrical relation with a structure of the second electrode in the other pixel unit relative to a row direction, and an aperture ratio of the pixel unit in which the slit of the second electrode is angled towards the thin film transistor is larger than an aperture ratio of the pixel unit in which the slit of the second electrode is angled away from the thin film transistor. By means of the pixel structure, any two adjacent pixel units in a column direction have the same overall liquid crystal luminous efficiency and the same transmittance, so as to prevent strips from occurring.

Figure 2:
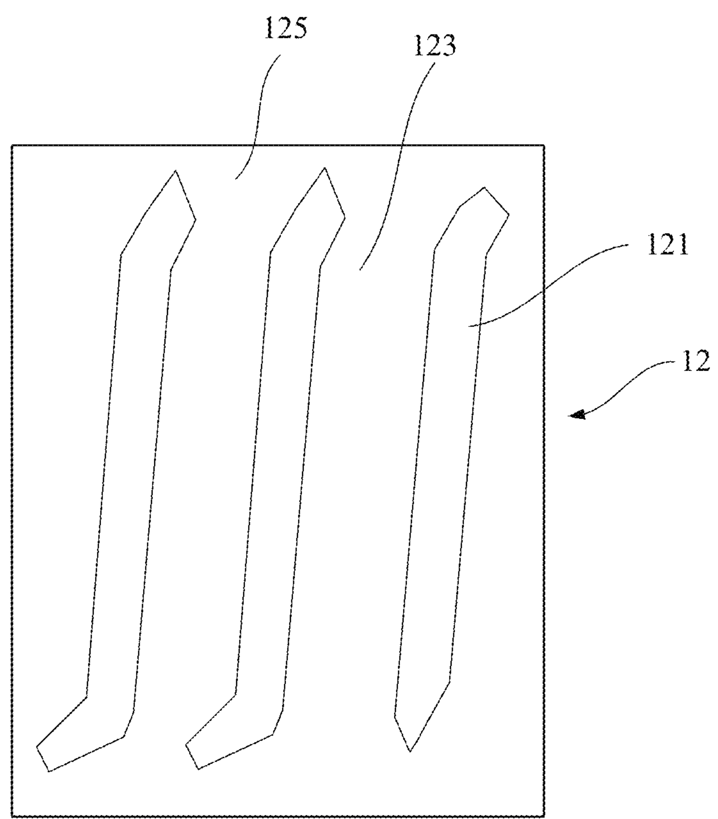
FIG. 2 is a schematic structural view of an electrode having a plurality of strip-shaped electrodes according to an embodiment of the present disclosure.

Referring to FIG. 1, a pixel structure according to an embodiment of the present disclosure is shown. The pixel structure may comprise a plurality of pixel units arranged in an array, for example, a first pixel unit 1 and a second pixel unit 2 as shown in FIG. 1. Each pixel unit may comprise a first electrode, a second electrode and a thin film transistor (TFT). As an example, the first pixel unit 1 as shown in FIG. 1 may comprise a first electrode 11, a second electrode 12 and a TFT 13. The second pixel unit 2 may comprise a first electrode 21, a second electrode 22 and a TFT 23. Further, as shown in FIG. 1, the first electrode 11 has a plate-like structure. Referring to FIGS. 1 and 2, the second electrode 12 has a plurality of strip-shaped electrodes 123 and connecting electrodes 125 to connect the plurality of strip-shaped electrodes together. A slit 121 is formed between each two adjacent strip-shaped electrodes. In the embodiment illustrated in FIG. 1, an end of each of the slits 121 facing towards the TFT 13 is angled. Similarly, the first electrode 21 has a plate-like structure, the second electrode 22 has a plurality of strip-shaped electrodes and connecting electrodes to connect the plurality of strip-shaped electrodes together. A slit 221 is formed between each two adjacent strip-shaped electrodes. In the embodiment illustrated in FIG. 1, an end of each of the slits 221 facing towards the TFT 23 is angled. As shown in FIG. 1, in any adjacent first pixel unit 1 and second pixel unit 2 in each column of pixel units, a structure of the second electrode 12 in the first pixel unit 1 is in a mirror symmetrical relation with a structure of the second electrode 22 in the second pixel unit 2 relative to a row direction.

As shown in FIG. 1, the slit 221 of the second electrode 22 of the second pixel unit 2 is angled towards the TFT 23, while the slit 121 of the first electrode 12 of the first pixel unit 1 is angled away from the TFT 13, and an aperture ratio of the second pixel unit 2 is larger than an aperture ratio of the first pixel unit 1.

As shown in FIG. 1, in any two adjacent first pixel unit 1 and second pixel unit 2 in each column of pixel units of the pixel structure, the structure of the second electrode 12 in the first pixel unit 1 is in a mirror symmetrical relation with the structure of the second electrode 22 in the second pixel unit 2 relative to the row direction. Further, the aperture ratio of the second pixel unit 2 in which the slit 221 of the second electrode 22 is angled towards the TFT 23 is larger than the aperture ratio of the first pixel unit 1. By means of the above pixel structure, in any two adjacent pixel units in each column of pixel units, the second pixel unit 2, in which the slit 221 of the second electrode 22 is angled towards the TFT 23, has a larger aperture ratio, while the first pixel unit 1 has a smaller aperture ratio.

Moreover, in a case that the slit 221 of the second electrode 22 in the second pixel unit 2 is angled towards the TFT 23, a pure liquid crystal luminous efficiency at the angled end of the slit 221 of the second pixel unit 22 is low. In a case that the slit 121 of the second electrode 12 in the first pixel unit 1 is angled away from the TFT 13, a pure liquid crystal luminous efficiency at the angled end of the slit 121 of the second pixel unit 12 is high. In order to prevent strips from occurring, it is necessary to make overall liquid crystal luminous efficiencies of any two adjacent pixel units in the column direction in the pixel structure be equal to each other.

The overall liquid crystal luminous efficiency is a product of the pure liquid crystal luminous efficiency and the aperture ratio. In other words, overall liquid crystal luminous efficiency=pure liquid crystal luminous efficiency * aperture ratio. As such, in a case that the pure liquid crystal luminous efficiency of each pixel unit is known, for example, in a case that the second pixel unit 2 in which the slit 221 of the second electrode 22 is angled towards the TFT 23 has a lower pure liquid crystal luminous efficiency and the first pixel unit 1 in which the slit 121 of the second electrode 12 is angled away from the TFT 13 has a higher pure liquid crystal luminous efficiency, the aperture ratio of the second pixel unit 2 in which the slit 221 of the second electrode 22 is angled towards the TFT 23 is set to be larger than the aperture ratio of the first pixel unit 1, so that the overall liquid crystal luminous efficiencies may be balanced. In this way, all the pixel units may have the same luminous efficiency, so as to prevent strips from occurring.

In an exemplary embodiment, the aperture ratio of each of the pixel units in the above pixel structure may be set in the following way. As shown in FIG. 1, a black matrix layer 14 in the pixel structure is provided with a first opening 141 at a position corresponding to the first pixel unit 1, and provided with a second opening 142 at a position corresponding to the second pixel unit 2. In an example, the first opening 141 has the same size as the second opening 142 in a row direction of the pixel unit, while a size a of the first opening 141 in a column direction of the pixel unit is smaller than a size b of the second opening 142 in the column direction. In this way, an area of the opening of the black matrix layer 14 at the position corresponding to the first pixel unit 1 is smaller than an area of the opening of the black matrix layer 14 at the position corresponding to the second pixel unit 2, that is, the aperture ratio of the first pixel unit 1 is smaller than the aperture ratio of the second pixel unit 2.

Figure 3:
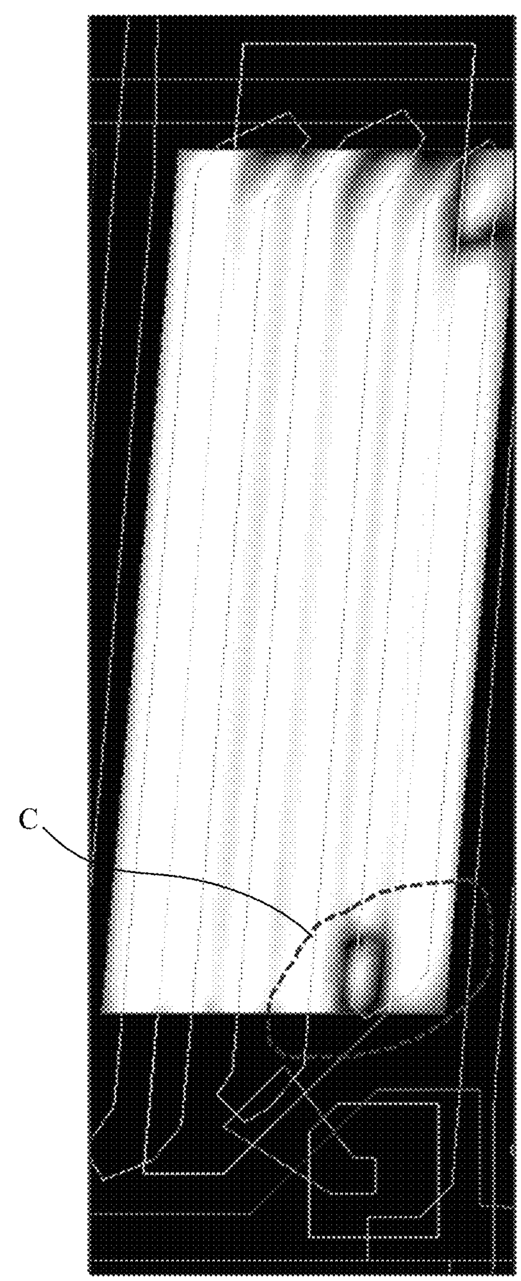
FIG. 3 is a simulated diagram of a liquid crystal luminous efficiency of an upper pixel unit in FIG. 1.
Figure 4:
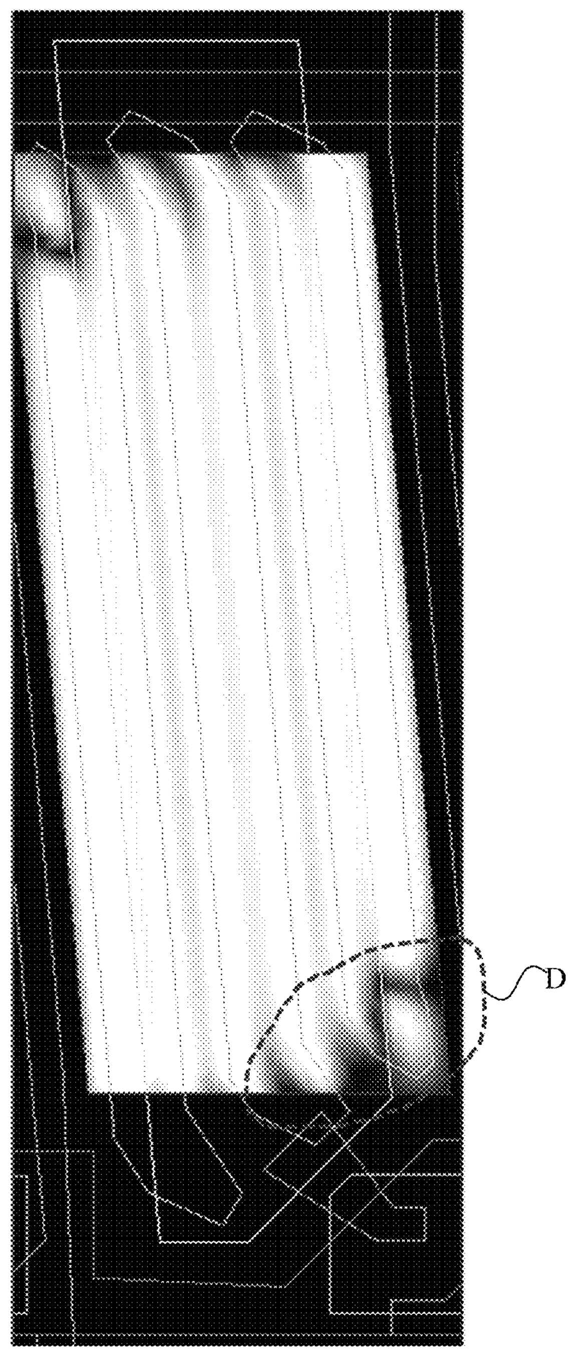
FIG. 4 is a simulated diagram of a liquid crystal luminous efficiency of a lower pixel unit in FIG. 1.

Simulated diagrams of pure liquid crystal luminous efficiencies of two adjacent pixel units in the column direction in the above pixel structure are shown in FIGS. 3 and 4, respectively. The pure liquid crystal luminous efficiency of the first pixel unit 1 is shown in FIG. 3, and the pure liquid crystal luminous efficiency of the second pixel unit 2 is shown in FIG. 4. Referring to FIGS. 3 and 4, an area of a dark region C of the first pixel unit 1 is smaller than an area of a dark region D of the second pixel unit 2. In order to make the overall liquid crystal luminous efficiencies of the two pixel units be equal to each other, it is necessary to increase the aperture ratio of the second pixel unit 2, so as to make the products of the pure liquid crystal luminous efficiency and the aperture ratio of the two pixel units be equal to each other.

Specifically, in each of the pixel units, the first electrode may be a common electrode while the second electrode may be a pixel electrode. As shown in FIG. 1, for example, in the first pixel unit 1, the first electrode 11 may be a common electrode while the second electrode 12 may be a pixel electrode.

Alternatively, in each of the pixel units, the first electrode may be a pixel electrode while the second electrode may be a common electrode. As shown in FIG. 1, for example, in the first pixel unit 1, the first electrode 11 may be a pixel electrode while the second electrode 12 may be a common electrode.

Further, the second electrodes in each row of pixel units may have the same structure, and the first electrodes in each row of pixel units may have the same structure.

An embodiment of the present disclosure may further provide a display panel. As shown in FIG. 1, the display panel may comprise the pixel structure according to any one of the above embodiments.

Figure 5:
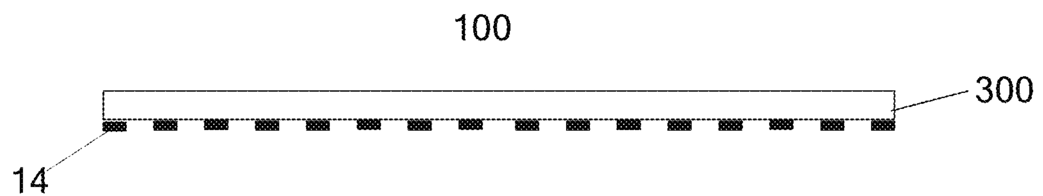
FIG. 5 is a schematic view of a display panel according to an embodiment of the present disclosure.

In an optional embodiment, the display panel may comprise an array substrate and an opposite substrate opposite to the array substrate. As shown in FIG. 5, the display panel 100 may comprise an array substrate 200, and an opposite substrate 300 opposite to the array substrate.

Specifically, the opposite substrate 300 is provided with the black matrix layer 14, so that the aperture ratio of each of the pixel units in the pixel structure may be controlled by means of the opening provided in the black matrix layer 14.

Figure 6:
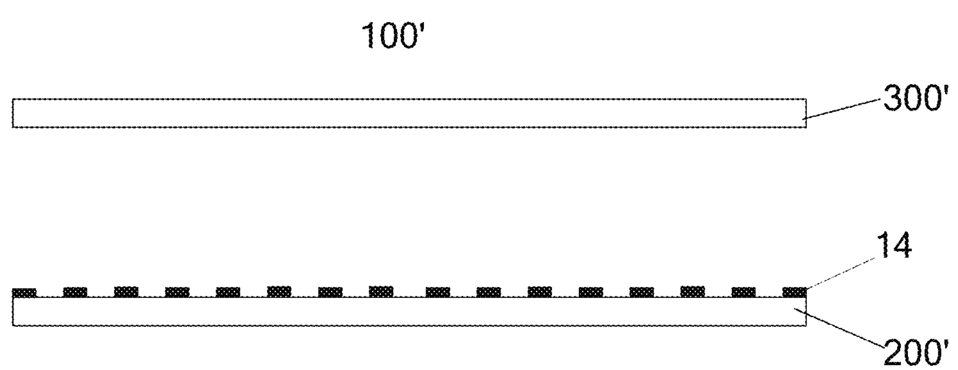
FIG. 6 is a schematic view of a display panel according to another embodiment of the present disclosure.

Alternatively, as shown in FIG. 6, the display panel 100' may comprise an array substrate 200', and an opposite substrate 300' opposite to the array substrate. The array substrate 200' is provided with the black matrix layer 14, so that the aperture ratio of each of the pixel units in the pixel structure may be controlled by means of the opening provided in the black matrix layer 14.

In the illustrated embodiment, the opposite substrate or the array substrate is provided with the black matrix layer 14 and the black matrix layer 14 is provided with the opening in each of the pixel units. As shown in FIG. 1, the black matrix layer 14 is provided with the first opening 141 in the first pixel unit 1 and the black matrix layer 14 is provided with the second opening 142 in the second pixel unit 2. The first opening 141 has the same size as the second opening 142 in the row direction of the pixel unit, while a size a of the first opening 141 in the column direction of the pixel unit is smaller than a size b of the second opening 142 in the column direction. In this way, an area of the opening of the black matrix layer 14 in the first pixel unit 1 is smaller than an area of the opening of the black matrix layer 14 in the second pixel unit 2, that is, the aperture ratio of the first pixel unit 1 is smaller than the aperture ratio of the second pixel unit 2. Therefore, the aperture ratio of the first pixel unit 1 may be controlled by means of the first opening 141 provided in the black matrix layer 14, and the aperture ratio of the second pixel unit 2 may be controlled by means of the second opening 142 provided in the black matrix layer 14.

Further, an embodiment of the present disclosure provides a display device. The display device may comprise the display panel according to any one of the above embodiments. The display device may be a liquid crystal display.

It is obvious for those skilled in the art that various changes and variants may be made to the embodiments of the present disclosure without departing from the spirit and scope of the present disclosure. Accordingly, these changes and variants are intended to be included in the present disclosure if they shall fall into the scope of the appended claims and equivalents thereof.

What is claimed is:

1. A pixel structure comprising a plurality of pixel units arranged in an array, wherein, each of the pixel units comprises a first electrode, a second electrode and a thin film transistor, the first electrode having a plate-like structure, the second electrode having a plurality of strip-shaped electrodes and connecting electrodes to connect the plurality of strip-shaped electrodes together, wherein a slit is formed between each two adjacent strip-shaped electrodes, and an end of each slit facing towards the thin film transistor is angled, and wherein, in any two adjacent pixel units in each column of pixel units, a structure of the second electrode in one pixel unit is in a mirror symmetrical relation with a structure of the second electrode in the other pixel unit relative to a row direction, and wherein, in any two adjacent pixel units in each column of pixel units, an aperture ratio of a pixel unit in which the slit of the second electrode is angled towards the thin film transistor is arranged to be larger than an aperture ratio of the other pixel unit.

2. The pixel structure according to claim 1, wherein, in each of the pixel units, the first electrode is a common electrode and the second electrode is a pixel electrode.

3. The pixel structure according to claim 1, wherein, in each of the pixel units, the first electrode is a pixel electrode and the second electrode is a common electrode.

4. The pixel structure according to claim 1, wherein, in each row of pixel units, the second electrodes have the same structure and the first electrodes have the same structure.

5. A display panel comprising the pixel structure according to claim 1.

6. The display panel according to claim 5, wherein, the display panel comprises an array substrate and an opposite substrate opposite to the array substrate, and wherein the opposite substrate is provided with a black matrix layer so that an aperture ratio of each of the pixel units in the pixel structure is controllable by means of an opening provided in the black matrix layer, or the array substrate is provided with a black matrix layer so that an aperture ratio of each of the pixel units in the pixel structure is controllable by means of an opening provided in the black matrix layer.

7. A display device comprising the display panel according claim 5.

8. The pixel structure according to claim 2, wherein, in each row of pixel units, the second electrodes have the same structure and the first electrodes have the same structure.

9. The pixel structure according to claim 3, wherein, in each row of pixel units, the second electrodes have the same structure and the first electrodes have the same structure.

10. A display panel comprising the pixel structure according to claim 2.

11. A display panel comprising the pixel structure according to claim 3.

12. A display panel comprising the pixel structure according to claim 4.

13. A display device comprising the display panel according to claim 6.

* * * * *